(12) United States Patent
Swierk et al.

(10) Patent No.: US 10,305,773 B2
(45) Date of Patent: May 28, 2019

(54) DEVICE IDENTITY AUGMENTATION

(71) Applicant: Dell Products, L.P., Round Rock, TX (US)

(72) Inventors: Todd Erick Swierk, Austin, TX (US); Marc Randall Hammons, Round Rock, TX (US); Tyler Ryan Cox, Austin, TX (US); Anantha K. Boyapalle, Cedar Park, TX (US)

(73) Assignee: Dell Products, L.P., Round Rock, TX (US)

( * ) Notice: Subject to any disclaimer, the term of this patent is extended or adjusted under 35 U.S.C. 154(b) by 201 days.

(21) Appl. No.: 15/433,435

(22) Filed: Feb. 15, 2017

(65) Prior Publication Data

US 2018/0234326 A1 Aug. 16, 2018

(51) Int. Cl.
*G06F 15/173* (2006.01)
*H04L 12/26* (2006.01)
*H04L 29/08* (2006.01)

(52) U.S. Cl.
CPC .............. *H04L 43/16* (2013.01); *H04L 43/08* (2013.01); *H04L 67/303* (2013.01); *H04L 67/12* (2013.01)

(58) Field of Classification Search
None
See application file for complete search history.

(56) References Cited

U.S. PATENT DOCUMENTS

| | | | | |
|---|---|---|---|---|
| 8,082,530 | B1* | 12/2011 | Ou | G06F 17/5036 716/106 |
| 8,756,307 | B1* | 6/2014 | Chen | G06F 11/3414 709/223 |
| 2007/0105184 | A1* | 5/2007 | Greenbaum | C12Q 1/025 435/29 |
| 2008/0060505 | A1* | 3/2008 | Chang | G10H 1/40 84/612 |
| 2012/0157875 | A1* | 6/2012 | Afargan | A61B 5/0488 600/547 |
| 2014/0173675 | A1* | 6/2014 | Ahmed | H04N 5/23206 725/116 |
| 2015/0127983 | A1* | 5/2015 | Trobough | G06F 11/2733 714/30 |
| 2015/0154291 | A1* | 6/2015 | Shepherd | G06F 17/30861 707/748 |
| 2016/0105344 | A1* | 4/2016 | Kim | H04L 43/08 709/224 |
| 2016/0164831 | A1* | 6/2016 | Kim | H04L 43/08 709/223 |
| 2016/0242670 | A1* | 8/2016 | Suzuki | G02C 7/027 |

(Continued)

*Primary Examiner* — Phyllis A Book
(74) *Attorney, Agent, or Firm* — Fogarty LLP

(57) ABSTRACT

Systems and methods for device identity augmentation. In some embodiments, an Information Handling System (IHS) may include a processor and a memory coupled to the processor, the memory including program instructions stored thereon that, upon execution by the processor, cause the IHS to: receive high-level metrics; receive low-level metrics; determine, using a plurality of sets of threshold values, that the high-level metrics and the low-level metrics match at least one of a plurality of device profiles; and at least one of: (a) identify a device as belonging to class of devices corresponding to the matching device profile, or (b) identify whether at least a subset of the high-level metrics or the low-level metrics are outside one or more of the sets of threshold values.

20 Claims, 5 Drawing Sheets

(56) References Cited

U.S. PATENT DOCUMENTS

| | | | |
|---|---|---|---|
| 2017/0070521 A1* | 3/2017 | Bailey | H04L 63/1416 |
| 2017/0070904 A1* | 3/2017 | Mali | H04W 24/10 |
| 2018/0027004 A1* | 1/2018 | Huang | H04L 63/1425 |
| | | | 726/23 |
| 2018/0089287 A1* | 3/2018 | Haggie | G06F 17/30946 |
| 2018/0089328 A1* | 3/2018 | Bath | G06F 17/30946 |
| 2018/0219754 A1* | 8/2018 | Udupi | H04L 43/08 |

* cited by examiner

DEVICE IDENTITY AUGMENTATION

FIELD

The present disclosure generally relates to Information Handling Systems (IHSs), and, more particularly, to systems and methods for device identity augmentation.

BACKGROUND

A new revolution is gaining momentum—a surge of innovation that involves vast ecosystems of sensors, devices, and networks that can transmit and receive data. With an estimated number of connected "things" reaching over 25 billion by 2020, the "Internet-of-Things" (IoT) is widely regarded as the next technological frontier.

Existing IoT deployments range from single device implementations to massive cross-platform systems that include tens, hundreds, or sometimes thousands of heterogeneous devices. Tying it all together are different communication protocols that enable these various components to talk to each other.

Because IoT is still in its infancy, however, its underlying technologies remain fractured. Alliances and coalitions are being formed in hopes of someday unifying the IoT landscape. But, at the present time, there is still no central IoT standard or deployment oversight. Consumers and providers continue to face ever-increasing deployment, architecture, analytics, and security challenges.

SUMMARY

Embodiments of systems and methods for device identity augmentation are described. In an illustrative, non-limiting embodiment, an Information Handling System (IHS) comprises one or more processors and a memory coupled to the one or more processors, the memory including program instructions stored thereon that, upon execution by the one or more processors, cause the IHS to: receive high-level metrics; receive low-level metrics; determine, using a plurality of sets of threshold values, that the high-level metrics and the low-level metrics match at least one of a plurality of device profiles; and at least one of: (a) identify a device as belonging to class of devices corresponding to the matching device profile, or (b) identify whether at least a subset of the high-level metrics or the low-level metrics are outside one or more of the sets of threshold values.

In various implementations, the IHS may be an Internet-of-Things (IoT) gateway in an IoT network, and the device may be an IoT device. The low-level metrics may include at least one of: a voltage measurement, a current measurement, or a line impedance measurement. Additionally or alternatively, the low-level metrics may include at least one of: a time to rise, a time to fall, a time between a rise and a fall, or a time between a fall and a rise. Additionally or alternatively, the low-level metrics may be obtained from a waveform representing an electronic communication between the device and the IHS. In contrast, the high-level device metrics may include at least one of: number of packets, packet size, packet content, request type, start time of request or communication, or end time of request of communication.

In some cases, the program instructions, upon execution, may further cause the IHS to decompose the waveform into frequency components and to compare the frequency components with other frequency components of another waveform of representing another electronic communication between another device and the IHS, where the other device belongs to a known class. To determine that that the high-level metrics and the low-level metrics match the at least one of the plurality of device profiles, the program instructions, upon execution, may further cause the IHS to perform a correlation operation between the high-level metrics and the low-level metrics. To determine that the high-level metrics and the low-level metrics match the at least one of the plurality of device profiles, the program instructions, upon execution, may further cause the IHS to associate at least one of the high-level metrics with at least one of the low-level metrics.

In some cases, the at least one of the high-level metrics may correspond to the device, and the at least one of the low-level metrics may correspond to another device. For example, the device may include a noise source, and the other device may include a microphone. The other device may produce an electrical or acoustic waveform as result of a command transmitted to the device via a serial communication bus.

In another illustrative, non-limiting embodiment, a method may implement one or more of the aforementioned operations. In yet another illustrative, non-limiting embodiment, a hardware memory device may have program instructions stored thereon that, upon execution by an IHS, cause the IHS to perform one or more of the aforementioned operations.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

Figure 1:
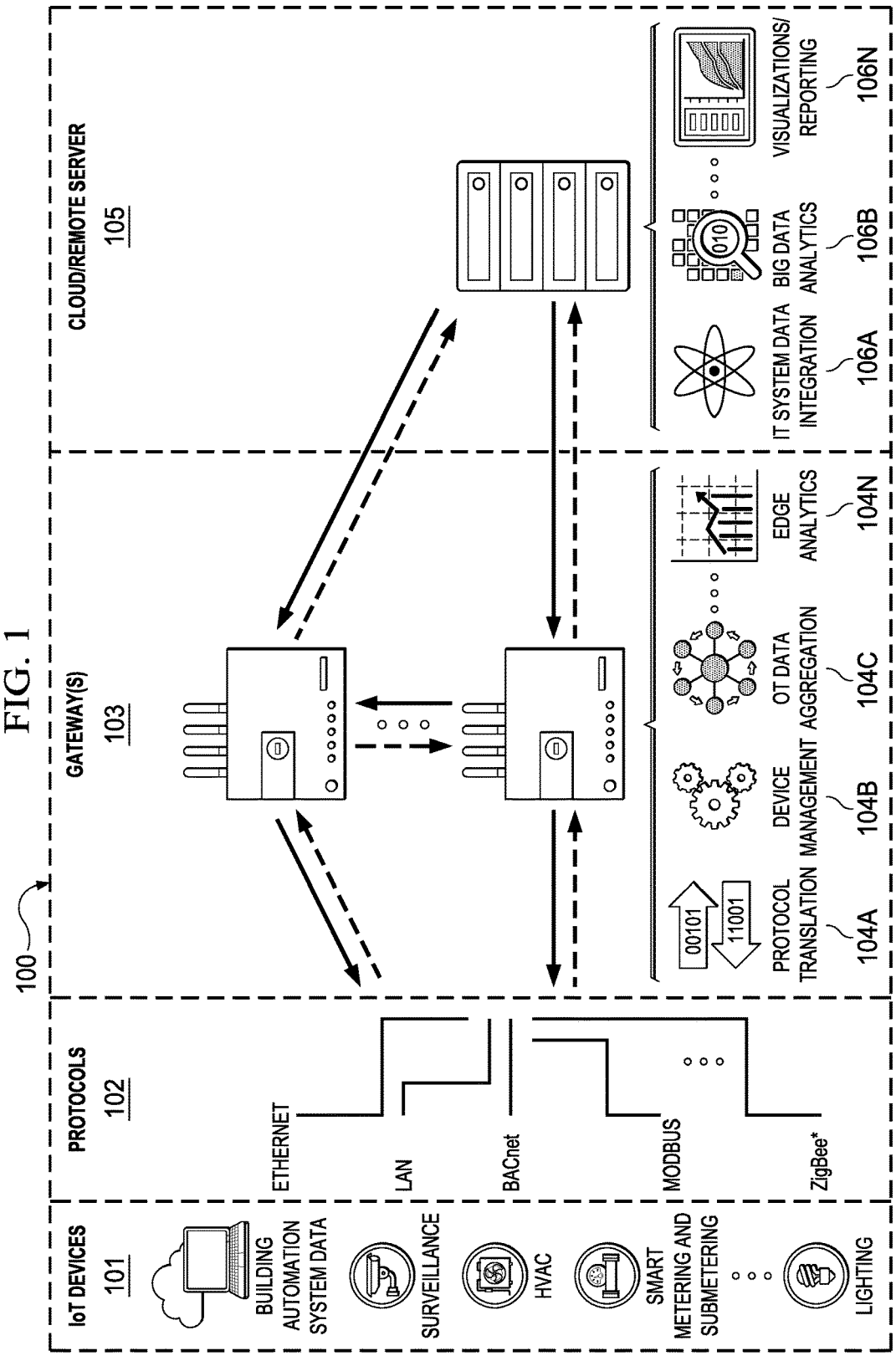
FIG. 1 illustrates an example of an Internet-of-Things (IoT) deployment according to some embodiments.

The Internet-of-Things (IoT) is an inter-networking of "things" or "objects" (generally referred to as "IoT devices") that promotes the collection and exchange of data among those objects. Generally speaking, IoT technology allows IoT devices to operate remotely across a network infrastructure to integrate the physical world into computer-based systems using a variety of different communication protocols. In the near future, it is expected that IoT will be used to automate nearly every field of human endeavor.

To name but a few examples, in the field of manufacturing, IoT may be used in process automation (chemicals, food, beverage, pharmaceuticals), discrete automation (auto, machine, electronics), and industrial equipment. In the field of transportation and logistics, IoT may be used in air, automotive, marine, or rail transport, fleet and freight management, cold chain logistics traffic systems, public transit and travel, and usage insurance. In the energy field, IoT may be used in power generation and distribution, smart grids, oil and gas, and renewable energy. In communications, IoT may be used to support various information technology (IT) services, network services, data centers, and communication equipment. With respect to natural resources, IoT may be used in agriculture, metals and minerals mining, water and waste management, forestry, fishing, and livestock, and golf courses. In healthcare, IoT may be used in hospitals, home care, health care plans, medical laboratories, biotechnology, and medical appliances and equipment. And in retail and hospitality, IoT may be used in hotels, vending machines, amusement parks, restaurants, sports and entertainment, etc.

In several implementations, IoT systems may provide or support services ranging among: predictive maintenance, process or quality control, fleet management, supply chain and inventory management, smart infrastructure, building optimization, remote asset management, secure and access control, point-of-sale support, energy management, compliance, safety, and documentation, among many others.

Yet the quintessential example of IoT remains home automation. Modern home automation deployments (also known as "smart" or "intelligent" homes) can include control and automation of lighting, heating, ventilation, air conditioning (HVAC) systems, and appliances such as washer/dryers, robotic vacuums, air purifiers, ovens or refrigerators/freezers that use wired or wireless networking for remote monitoring and control.

The expansion of IoT into a plethora of new application areas is expected to generate incredibly large amounts of data from diverse, heterogeneous devices and locations. Nonetheless, there are currently no central standards in this field. Consequently, IoT consumers and providers continue to face many deployment, architecture, analytics, and security challenges.

To address some of these challenges, the inventors hereof have developed a number of systems and methods that have directly applicable to many IoT environments, deployments, and implementations. Each of these systems and methods may be categorized within one or more of the following areas: Acquisition, Transport, Aggregation, Analysis, and Control.

Acquisition encompasses the hardware—the IoT devices—that capture data from interactions with the environment, with other machines, with humans or other living things and make it available for transmission over a network. Sensors are the nerve ends of IoT, and a growing assortment of devices are collecting data. There are cases where historical data may be analyzed to provide business practice improvements (not all data needs to originate from sensors).

Transport takes the acquired data from various sensors and moves it over a network for aggregation and analysis. As the name implies, the final stages of data transport generally flow over communication protocols (e.g., TCP/IP and others referred to below), and may be transformed into Internet friendly data formats like REST, JSON, or XML.

Aggregation is responsible for the collection and distribution of output data to designated consumers. Consumers can include databases, on-site services, analytics services, enterprise service buses, third-party cloud services and similar repositories.

Analysis takes the aggregated data and turns it into operational insights by applying context specific algorithms, rules, and predictive models. In most deployments, IoT analytics may include feedback capabilities so that the predictive models get better over time. In some cases, analytics may be run in the cloud or on the edge such as on an IoT gateway device.

Control provides the ability to act based upon insights gleaned from the analysis of IoT data. Different types of control actions available may range from graphical representation to humans, who can then take manual actions, to fully autonomous systems that can take orchestrated actions to improve operations, recognize and mitigate failures and threats, and prevent hazards.

For example, consider a relatively simple use case of environmental monitoring of an office building. Assume, that there are sensors installed throughout the building to monitor temperature and carbon monoxide levels; this is part of the aforementioned data aggregation component of IoT. As part of the transport component, there are many technology protocols that may be used to transport the collected data, including BACnet (Building and Automation Control networks), Zigbee, Bluetooth Low Energy, Wi-Fi, and others, which may use IoT gateway(s) to translate the sensors' data or communications to a cloud or remote backend server.

From the gateway(s), data is communicated through an aggregation layer as part of the aggregation component. The aggregated data reaches a cloud based analysis engine that enables the system to responds to changes in the monitored environment. For instance, such a system may be used to enforce a rule such that, if a room temperature gets too hot, a command is issued to turn up the A/C.

Overlaying each of these components are techniques related to security, data governance, and systems management of the IoT infrastructure.

To illustrate an example of an IoT environment where the systems and methods described herein may be implemented, FIG. 1 shows IoT deployment 100 according to some embodiments. Particularly, deployment 100 includes IoT device(s) 101, such as building automation and data devices, surveillance devices, HVAC devices, smart metering and sub-metering, lighting devices, etc., which provide and receive data of a network using one or more communication protocols 102, such as Ethernet, BACnet (Building Automation and Control), Controller Area Network (CAN bus), Modbus, Zigbee, Bluetooth, Wi-Fi, RFID, etc.

Using protocol(s) 102, IoT devices 101 communicate with IoT gateway(s) 103. In several implementations, IoT gateway(s) 103 may include services such as protocol translation 104A, device management 104B, data aggregation 104C, and edge analytics 104N. In many cases, elements 101-103 may be disposed or employed in the same premises (e.g., a building, a home, a vehicle, etc.) and/or may be owned by (or licensed to) the same entity or consumer.

In many implementations, however, gateway(s) 103 may also be in communication with cloud or remote server(s) 105, which can then provide services such as IT system data integration 106A, big data analytics 106B, and visualization and reporting 106N. For example, cloud or remote server(s) may be provided or operated by a third-party remotely located with respect to the premises where the IoT device(s) 101 and gateway(s) 103 are deployed.

Here it should be emphasized that IoT deployment 100 is depicted for sake of illustration only. There are virtually infinite different configurations possible in any given IoT deployment. In fact, it is often desirable that a given IoT installation remain flexible, so that new and different IoT devices, gateways, switches, access points, servers, services, etc. may be added, removed, or replaced, as the IoT network evolves over time. Although the techniques discussed herein are immediately applicable to the example IoT deployment 100 of FIG. 1, it is understood that the same techniques may be equally application to any IoT environment.

B. Hardware

In some embodiments, one or more of gateway(s) 103, server(s) 105, and/or IoT devices 101 shown in FIG. 1 may be implemented as an Information Handling System (IHS). For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes.

For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of NVMs.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

Figure 2:
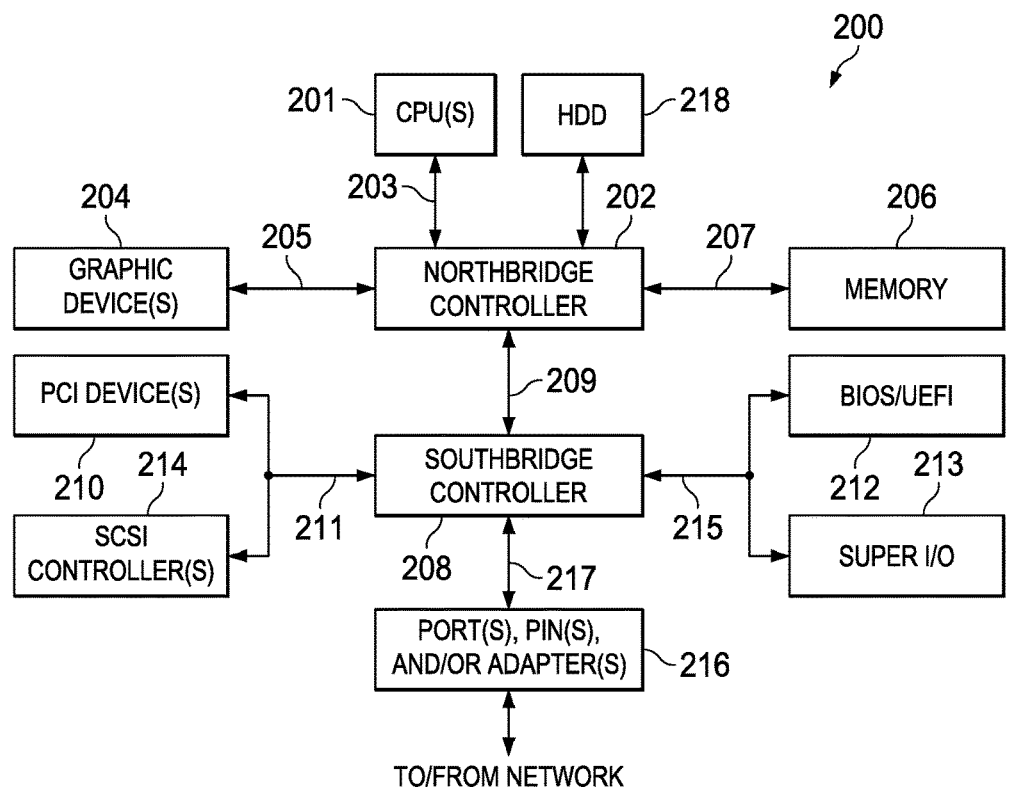
FIG. 2 illustrates an example of an Information Handling System (IHS) implementation according to some embodiments.

FIG. 2 is a block diagram of an example of an IHS. Although IHS 200 may be used to build any component shown in FIG. 1, it is particularly applicable to implementations of IoT gateway(s) 103. In some situations, an IoT gateway can have additional compute added if edge analytics are needed on the gateway at the network edge, as opposed to being distributed in the cloud/backend server.

As shown, IHS 200 includes one or more CPUs 201. In various embodiments, IHS 200 may be a single-processor system including one CPU 201, or a multi-processor system including two or more CPU(s) 201 (e.g., two, four, eight, or any other suitable number). CPU(s) 201 may include any processor capable of executing program instructions. For example, in various embodiments, CPU(s) 201 may be general-purpose or embedded processors implementing any of a variety of Instruction Set Architectures (ISAs), such as the x86, POWERPC®, ARM®, SPARC®, or MIPS® ISAs, or any other suitable ISA. In multi-processor systems, each of CPU(s) 201 may commonly, but not necessarily, implement the same ISA.

In some cases, one or more of CPU(s) 201 may include a Graphics Processing Unit (GPU), field programmable gate array (FPGA), or other suitable integrated component that is specifically used to perform analytics (e.g., machine learning).

CPU(s) 201 are coupled to northbridge controller or chipset 202 via front-side bus 203. Northbridge controller 202 may be configured to coordinate I/O traffic between CPU(s) 201 and other components. For example, in this particular implementation, northbridge controller 202 is coupled to graphics device(s) 204 (e.g., one or more video cards or adaptors) via graphics bus 205 (e.g., an Accelerated Graphics Port or AGP bus, a Peripheral Component Interconnect or PCI bus, or the like).

Northbridge controller 202 is also coupled to system memory 206 via memory bus 207, and to hard disk drive (HDD) 218. Memory 206 may be configured to store program instructions and/or data accessible by CPU(s) 201. In various embodiments, memory 206 may be implemented using any suitable memory technology, such as static RAM (SRAM), synchronous dynamic RAM (SDRAM), nonvolatile/Flash-type memory, or any other type of memory. Conversely, HDD 218 may include any magnetic, solid-state (SSD), or hybrid data storage device capable of storing an OS and other applications.

In operation, CPU(s) 201 execute program instructions that are stored in memory 206 and/or HDD 218. Under control of those instructions, IHS 200 may be configured to provide a number or services described in more detail below.

Northbridge controller 202 is coupled to southbridge controller or chipset 208 via internal bus 209. Generally speaking, southbridge controller 208 may be configured to handle various of IHS 200's I/O operations, and it may provide interfaces such as, for instance, Universal Serial Bus (USB), audio, serial (e.g., RS232, RS485, CANbus, RS422, etc.), parallel, Ethernet, or the like via port(s), pin(s) (e.g. GPIO or General-Purpose Input Output), and/or adapter(s) 216 over bus 217.

For example, southbridge controller 208 may be configured to allow data to be exchanged between IHS 200 and other devices, such as other IHSs attached to a network (e.g., network 101). In various embodiments, southbridge controller 208 may support communication via wired or wireless general data networks, such as any suitable type of Ethernet network, for example; via telecommunications/telephony networks such as analog voice networks or digital fiber communications networks; via storage area networks such as Fiber Channel SANs; or via any other suitable type of network and/or protocol.

Southbridge controller 208 may also enable connection to one or more keyboards, keypads, touch screens, scanning devices, voice or optical recognition devices, or any other devices suitable for entering or retrieving data. Multiple I/O devices may be present in IHS 200. In some embodiments, I/O devices may be separate from IHS 200 and may interact with IHS 200 through a wired or wireless connection. As shown, southbridge controller 208 is further coupled to one or more PCI devices 210 (e.g., modems, network cards, sound cards, or video cards) and to one or more SCSI controllers 214 via parallel bus 211.

Southbridge controller 208 is also coupled to BIOS/UEFI 212 and to Super I/O Controller 213 via Low Pin Count (LPC) bus 215. BIOS/UEFI 212 includes non-volatile memory having program instructions stored thereon. Those instructions may be usable by CPU(s) 201 to initialize and test other hardware components and/or to load an Operating System (OS) onto IHS 200. Super I/O Controller 213 combines interfaces for a variety of lower bandwidth or low data rate devices. Those devices may include, for example, floppy disks, parallel ports, keyboard and mouse, temperature sensor and fan speed monitoring/control, among others. In various implementations, southbridge controller 208 may be configured to allow data to be exchanged between BIOS/UEFI 212 and another IHS attached to a network (e.g., a remote server or other source of technical service) using wired or wireless capabilities of network adapter 216.

In some cases, IHS 200 may be configured to provide access to different types of computer-accessible media separate from memory 206. Generally speaking, a computer-accessible medium may include any tangible, non-transitory storage media or memory media such as electronic, magnetic, or optical media—e.g., magnetic disk, a hard drive, a CD/DVD-ROM, a Flash memory, etc. coupled to IHS 200 via northbridge controller 202 and/or southbridge controller 208.

The terms "physical," "hardware," "tangible," and "non-transitory," when used in the context of computer-readable storage or memories, are intended to describe devices excluding propagating electromagnetic signals; but are not intended to otherwise limit the type of physical storage device. For instance, the aforementioned terms are intended to encompass types of hardware, physical storage devices that do not necessarily store information permanently, including, for example, RAM. Program instructions and data stored on a physical memory device in non-transitory form may afterwards be transmitted by transmission media or signals such as electrical, electromagnetic, or digital signals, as a separate or independent process, which may then be conveyed via a communication medium such as a network and/or a wireless link.

A person of ordinary skill in the art will appreciate that IHS 200 is merely illustrative and is not intended to limit the scope of the disclosure described herein. In particular, any computer system and/or device may include any combination of hardware or software capable of performing certain operations described herein. In addition, the operations performed by the illustrated components may, in some embodiments, be performed by fewer components or distributed across additional components. Similarly, in other embodiments, the operations of some of the illustrated components may not be performed and/or other additional operations may be available.

For example, in some implementations, northbridge controller 202 may be combined with southbridge controller 208, and/or be at least partially incorporated into CPU(s) 201. In other implementations, one or more of the devices or components shown in FIG. 2 may be absent, or one or more other components may be present. For instance, in some cases, IHS 200 may include a Trusted Platform Module (TPM) or secure cryptoprocessor, not shown in FIG. 2 for sake of simplicity. But it should be readily understood that the systems and methods described herein may be implemented or executed with other IHS configurations.

In various embodiments, IHS 200 may be contained within a chassis, case, or other enclosure. And, in many applications, such a chassis may have an industrial or rugged design that can be fan-less, operate within a temperature range (e.g., −10° C.-70° C.), support multiple power supplies and/or wireless antennas, etc.

Figure 3:
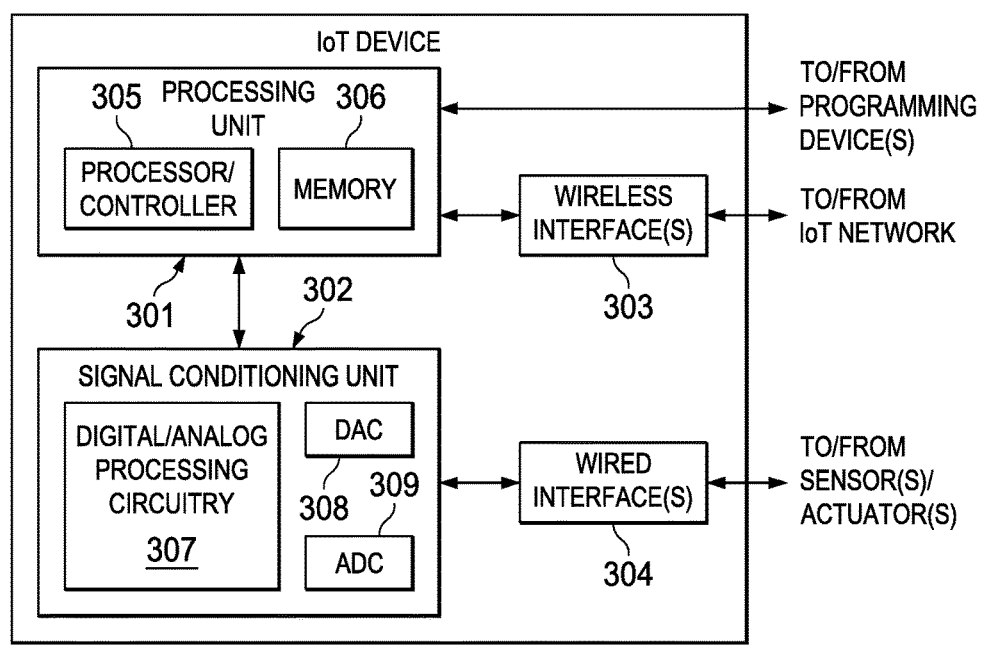
FIG. 3 illustrates an example of an IoT device implementation according to some embodiments.

Referring now to FIG. 3, any given one of IoT devices 101 of FIG. 1 may be implemented as device 300. It should be noted, however, that IoT device architectures typically vary widely from device to device. Generally speaking, IoT devices range from legacy sensors and actuators (e.g., interfaced via adaptors, hubs, or other circuitry that provides network connectivity) to sophisticated embedded devices and IHSs, such as IHS 200 of FIG. 2.

Therefore, although device 300 is likely to be found in a modern IoT environment, it should also be kept in mind that the various components of device 300 are discussed for sake of illustration only. It should be readily understood, however, that certain systems and methods described herein may be implemented or executed with other IoT device configurations.

Referring back to FIG. 3, IoT device 300 includes processing unit 301, signal conditioning unit 302, wireless interface 303, and wired interface 304. Processing unit 301 includes processor or controller 305 and memory 306. Signal conditioning unit 302 includes digital/analog processing circuitry 307, digital-to-analog converter (DAC) 308, and analog-to-digital converter (ADC) 309.

Wireless interface 303 may include any hardware, circuitry, and/or software that enables IoT device 300 to receive and/or transmit data over a wireless medium. Examples of wireless networks include, but are not limited to, Wi-Fi, Bluetooth, BLE, ZigBee, Z-wave, 6LoWPAN, Thread, Sigfox, LoRA, WirelessHD, WiGig, HaLow, NFC, RFID, SigFox LoRaWAN, Ingenu, Weightless, ANT, DigiMesh, MiWi EnOcean, Dash7, or WirelessHART networks, cellular networks (e.g., second generation (2G), third generation (3G), fourth generation (4G), a Long Term Evolution (LTE), a fifth generation (5G) network), and satellite networks. Typically, wireless interface(s) 303 are used to communicate data between IoT devices, IoT gateways, backend servers, etc. ("to/from IoT network").

Wired interface 304 may include any hardware, circuitry, and/or software that enables IoT device 300 to receive and/or transmit data over a wired medium. Examples of wired networks include Ethernet, cable, optical fiber, USB, HDMI, DSL, PowerLine, HomePlug, HomePNA, X10, and Public Switched Telephone Networks (PSTN). Similarly as above, wired interface(s) 304 may also be used to communicate data over an IoT network.

Additionally or alternatively, wired interface 304 may include circuitry configured to receive and transmit digital signals or data such as, for example, RS232, RS485, CANbus, RS422, USB, video signals (e.g., to and from a monitor or camera), and GPIO. Additionally or alternatively, wired interface 304 may be used to transmit and receive analog signals usable to indicate and/or to control the status of buttons, switches, contactors, actuators, etc. ("to/from sensor(s)/actuator(s)").

Processor or controller 305 and memory 306 operate similarly as CPU(s) 201 and memories 206 and 218 of IHS 200. That is, processor 305 executes program instructions that are either stored in the processor itself or in memory 306. Under control of those instructions, IoT device 300 may be configured to provide a number or services described in more detail below. In some cases, a programming device may provide such instructions to processor/controller 305 using a dedicated PLC interface or the like ("to/from programming device(s)").

Digital/analog processing circuitry 307 may include any digital or analog circuitry configured condition input or output signals that are received or transmitted by IoT device 300, particularly through wired interface(s) 304. For example, analog signals may be transmitted using DAC circuitry 308 and received using ADC circuitry 309. Accordingly, processing circuitry 307 may include any signal processing circuit (DSP), filter, amplifier, mixer, integrator, limiter, oscillator, impedance, rectifier, etc. In some cases, digital/analog processing circuitry 307 may be integrated into processor/controller 305.

It should be noted that, it many applications, any hardware equipment used to interconnect any component in an IoT network may itself be an IoT device (e.g., a wireless access point, a network switch, a legacy sensor hub or aggregator, etc.). Additionally or alternatively, in many applications, otherwise conventional IHS devices, such as, for example, computers, desktops, smart phones, tablets, etc., may also operate as IoT devices.

C. Services

Figure 4:
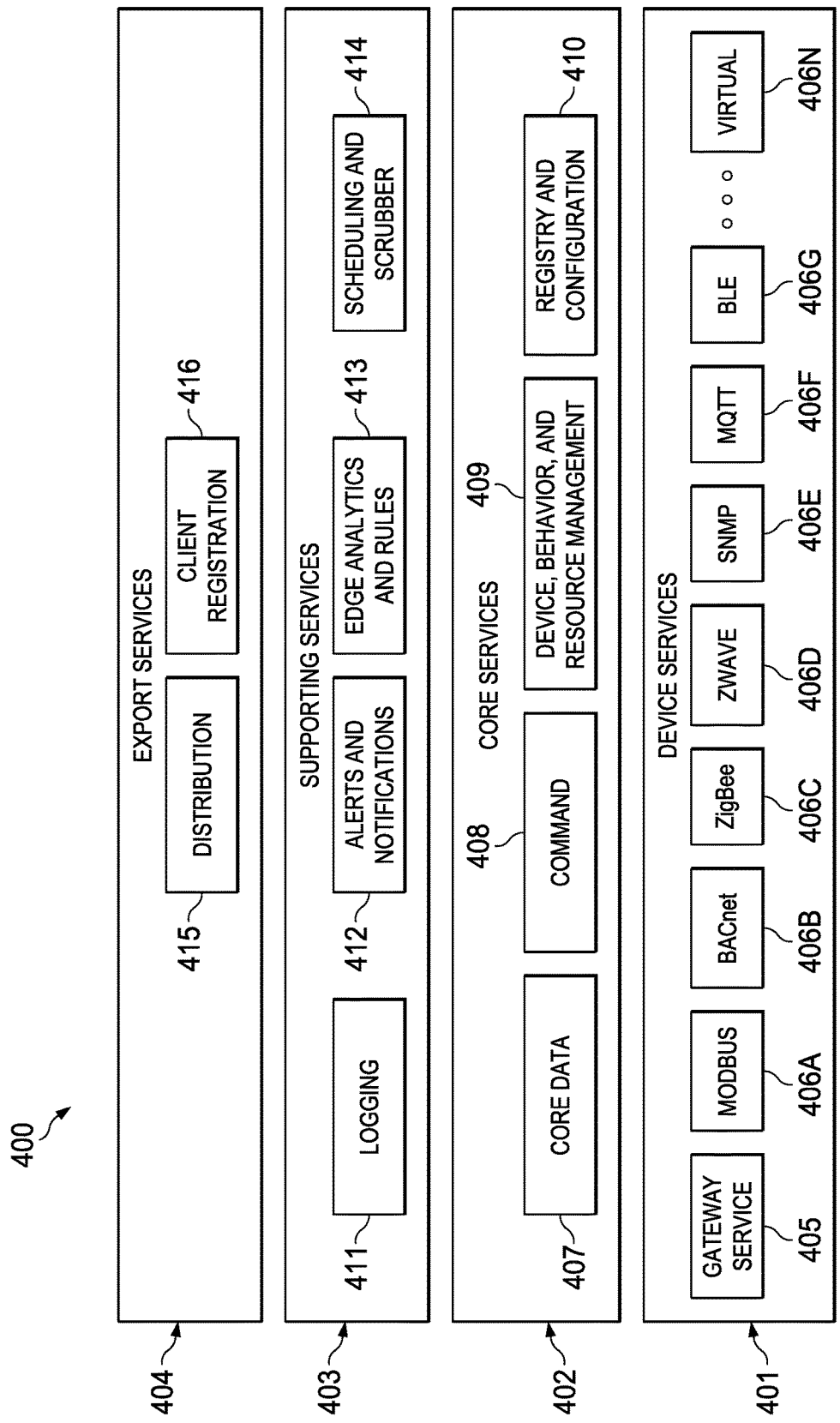
FIG. 4 illustrates examples of IoT services according to some embodiments.

FIG. 4 illustrates examples of IoT services. In various embodiments, services 400 may be provided and/or enabled via execution of program instructions by CPU(s) 201 of IHS 200 (FIG. 2) implementing any given one of IoT gateway(s) 103 (FIG. 1). In this particular implementation, services 400 include device services 401, core services 402, supporting services 403, and export services 404.

Device services 401 enable IoT gateway(s) 103 to transmit and receive data to and from IoT devices 101 and/or other IoT gateway(s) 103 over wireless and/or wired interfaces 303 and 304, respectively. In this embodiment, device services 401 include the following modules or microservices: gateway service 405 (Peer-to-Peer or P2P), Modbus service 406A, BACnet service 406B, ZigBee service 406C, Zwave service 406D, SNMP service 406E, MQTT service 406F, BLE service 406G, and virtual service 406N (for virtual IoT devices). It should be noted, however, that in other embodiments, device services 401 may include other modules or microservices configured to enable IoT gateway(s) 103 to perform operations described herein, including, for example, communicating with any device in the IoT network using a suitable communication protocol.

Core services 402 enable IoT gateway(s) 103 to receive and store data in memory, to issue commands to IoT devices using device services 401, to manage metadata and provisioning of IoT devices, as well as IoT device registration and configuration. In this embodiment, core services 402 include the following modules or microservices: core data service 407; command service 408; device, behavior, and resource management service 409; and registry and configuration service 410. It should be noted, however, that in other embodiments, core services 402 may include other modules or microservices configured to enable IoT gateway(s) 103 to perform operations described herein.

Supporting services 403 enable IoT gateway(s) 103 to log events generate alerts and notification, and to apply rules, as well as scheduling, and scrubbing. In this embodiment, export services 404 include the following modules or microservices: distribution 415 and client registration module 416. It should be noted, however, that in other embodiments, supporting services 403 may include other modules or microservices configured to enable IoT gateway(s) 103 to perform operations described herein.

Export services 404 enable IoT gateway(s) 103 to distribute data to other IoT gateway(s) 103 and/or server 105, as well as to perform client registration operations. In this embodiment, export services 404 include the following modules or microservices: distribution 415 and client registration 416. It should be noted, however, that in other embodiments, export services 404 may include other modules or microservices configured to enable IoT gateway(s) 103 to perform operations described herein.

In various embodiments, any given one of microservices 405-416 may be provided in the form of program instructions executable by CPU(s) 201. In some cases, all of microservices 405-416 are written in the same programming language. In other cases, however, different microservices may be written in different languages. Examples of suitable programming languages include, but are not limited to: Java, C, Javascript, C++, Python, Node.js, PHP, Lua., Assembler, Go, SWIFT, Rust, Parasail, B#, Ruby, Haskell, erlang, scala, R, etc.

In operation, microservices 405-416 may communicate with each other any suitable communication protocol. For example, in some cases, inter-service communications may use RESTful interfaces. In other embodiments, however, communications may be supported by other protocols such as ZeroMQ (OMQ), MQTT, AMPQ, SNMP, DDS, or the like.

D. Example Applications

In some embodiments, a variety of IoT techniques may be implemented, at least in part, by one or more gateway(s) 103 configured with one or more of services 400. Examples of these applications are discussed in turn below.

i. Gateway Classification

In some embodiments, cluster analysis may be used to classify large, heterogeneous system installations using enterprise server and client system configuration information. A problem with IoT gateways is that, by itself, the gateway lacks a way to differentiate itself by its internals. IoT devices connected to an IoT gateway are key ingredients in that gateway's classification. While a large deployment may use one gateway model for one type of usage model, it is much more common to have a large installation of the same gateway model with widely varying usage models.

Accordingly, techniques may be used for gathering aggregate classification data for important variables, such as IoT devices connected to the gateway and how they are used. Looking across multiple gateways, across multiple sites and geographies, an administrator can employ this classification method in order to understand the topography of their IoT landscape.

IoT gateways provide data aggregation and analysis across disparate end points. These end points vary in their connection type and their typical data access patterns. It is valuable to administrators of IoT Gateway networks to classify gateways by way of their end points, connection types, and data access patterns in order to provide more descriptive topology. In some embodiments, edge analytics and rules microservice 409 may be used to implement these techniques.

Classification may begin by gathering data across a large sample set of the population of IoT gateways, including their end points connected and summaries of each end points utilization rates and data access patterns. These factors are then incorporated into a cluster analysis, such as a K-Means (Least Sum of Squares) algorithm or the like, to produce some number of clusters.

Cluster models may vary in the number of clusters produced and these models compared and contrasted to identify which are supported by a priori knowledge of the market. With these new insights, products and solutions may be offered which target the densest regions of the cluster analysis with optimized solutions that deliver the best performance and reliability within the primary predictor variables such as the type of end points connected and their data access patterns.

In some cases, analysis of gateway end point connectivity and access patterns allow them to be classified into use case clusters. Additionally or alternatively, identification of cluster centers may describe a subset of gateways based on end point device connectivity and utilization. Additionally or alternatively, trends in connectivity and utilization across gateways may be analyzed over time as usages split, merge, and evolve.

ii. Device Profiles

IoT is more fragmented than ever before. Many IoT devices or sensors that are manufactured today operate with a number of different communication protocols. As a result, interoperability within a system that includes sensors from different manufacturers operating on multiple protocols is difficult. It is extremely challenging to mine the data into a common framework for intelligent analysis and decision making.

And it is impossible to automate a system to command and control a sensor based on a condition occurring in another system. For example, if a system detects extreme temperatures of a car engine (e.g., (−30 C to 70 C) it has to slow down the RPM of the motor). If the temperature sensor and engine are operating under different protocols from different manufacturers, it is impossible for a system to detect this condition and execute the remedy if both the devices are not operating within the same operating framework.

Accordingly, in some embodiments, systems and methods provided herein describe an IoT device (e.g., a sensor) in data format. In some embodiments, device, behavior, and resource management service 409 may be used to implement these techniques. The description of the device may enable methods of retrieving data from the device and methods to command and control the device. Such a description may abstract any implementation complexity of any device that communicates over any protocol.

In some cases, firmware on a gateway may detect a hot-plug event, walk address spaces, probe the newly plugged IoT device, and download a device profile from the cloud.

Some implementations may involve the pre-provisioning of IoT devices on the gateway by inspecting the device to determine its identity and state, and then taking steps to configure the device with a known set of default values prior to registering it with a broader system. Pre-provisioning may enable features such as calibration of the sensor so that the gateway can reliably depend upon the type of information from IoT device (e.g., a pre-provisioning process switches a register on the sensor so that it only sends temperature in Fahrenheit when queried).

In other implementations, legacy devices may have a QR code printed on the sensor that can be used to pull the profile information of the sensor from the cloud as part of pre-provisioning. In yet other implementations, firmware may be included in the sensor that communicates with firmware of the gateway about the type and profile of the device which exposes the data to the application layer.

In some embodiments, a new sensor may be added to a software framework running on a gateway without disturbing the existing configuration on the gateway and without restarting any service. In other embodiments, firmware on the gateway may be configured to understand the descriptive language provided by the operator and to start acting upon the device and soon as it is provisioned on the gateway. The firmware may indicate with a signal (e.g., blinking LED or sending SMS/email) when a new sensor is provisioned on the gateway. In yet other embodiments, firmware on the gateway when the operator wants to mine the data from sensors from different manufacturers or protocols.

In some cases, data from all sensors collected at the firmware level may be similar to each other and all of them may be operated at the highest level without any knowledge of the protocol or the system they are operating in.

In sum, systems and methods described herein may abstract the device protocol from user, for example, by using a provisioning service to get connection information from sensor directly, describing a device to the framework which is running on the gateway, providing a common command and control different devices operating on different protocols, and/or creating a homogenous representation of sensors operating on multiple protocols from different manufacturers.

iii. Device Identity

Protecting deployed infrastructure in an IoT environment can be difficult, particularly when dealing with legacy devices and sensors. Due to their age, legacy devices provide little if any protection against tamper, spoofing, data injection, or other malicious behavior that an attacker may undertake. Newer devices may provide some provisions for security but these are often neither comprehensive nor foolproof without careful orchestration and deployment. Without proper safeguards, there is the potential for compromise of sensitive information, destruction of property, and other material loss.

In some cases, systems and methods described herein may augment or enhance the identity of a device by measuring various hardware and software based interactions with it and tracking them over time to establish a pattern of device characteristics and behavior. Once the behavioral pattern is established, then deviations from that pattern may be detected and preventive and corrective actions taken to protect against malicious behavior. In some embodiments, device, behavior, and resource management service 409 may be used to implement these techniques.

Additionally or alternatively, anomalous behaviors may be detected across a group of homogenous sensors—e.g., one behaving unusually relative to others. Additionally or alternatively, anomalous behavior may be detected across a set of heterogeneous devices—e.g., device is thought to be offline but is registering unusual current/voltage on an associated power meter. Given that these measurements and their assessment may only be known to the system, this makes it difficult for an attacker to know what is being measured. Moreover, a system may change these factors at any time, increasing tampering difficulty.

In various embodiments, measured items may include, but are not limited to: latency of request/responses, frequency of indications, consistency of content in responses as compared to expected content, correlations among measurements related to the device, from the device itself and other devices, electrical voltage, electrical current, and/or electrical impedance on physical connections during communications, bit error rates, SNR, etc., changes in boot times, initial connection times, noise on a connection during idle periods, and environmental factors, such as distance relative to signal strength.

As such, systems and methods described herein may collect hardware and/or software metrics associated with a device, characterize, augment and establish device identity using collected metrics, perform analysis of collected metrics against established device identity metrics, detect anomalous metrics, take actions based upon detection, and/or allow for reestablishment of identity due to changes in environment, device composition, or other factors.

iv. Overload Prevention

In some embodiments, systems and methods described herein may perform overload prevention. An overload prevention routine within device, behavior, and resource management service 409 may be used to manage gateway resources by making decisions based on multiple data sources. A resource usage anomaly may cause the overload prevention module to take steps to prevent anomalous or excessive traffic from entering the system and configure the gateway to work around the affected services or interfaces. The device, behavior, and resource management service 409 may also be used as a system management capability as a failsafe way to silence a rogue gateway or managed device.

In some implementations, device, behavior, and resource management service 409 may detect anomalous levels of resource consumption by a service or on an interface compared to an ongoing baseline. To preserve functionality, the device, behavior, and resource management service 409 may reconfigure the affected service or communication medium based on current and historical data. This action may include postponing low priority actions, reducing collection rate, volume, devices served, stopping services, and disabling interfaces. The overload prevention routine may use a blend of operator priority specifications and data characteristics to intelligently preserve as much system functionality as possible, including rerouting communication through other interfaces.

In sum, systems and methods described herein may, using resource consumption, device configuration, dynamic data volatility metrics, and service configuration, balance microservices and communications interfaces to protect against attacks and erroneous states by intelligently degrading capability. These system and methods may also use content and context-aware methods to determine which progressively more aggressive mitigations options to take.

v. Safeguard and Recovery

IoT Gateways aggregate data collected by managed IoT devices. In some cases, such data may contain information about power anomalies likely to affect managed devices immediately or in the near future. Accordingly, in some systems and methods described herein, the gateway may take action to preserve system health. In some embodiments, device, behavior, and resource management service 409 may be used to implement these techniques.

For example, the gateway may sense an incoming power/environmental anomaly (e.g., weather, voltage, current, or phase), and it may take action to preserve the system. Gateway actions may include, but are not limited to: graceful shutdown of managed devices, reduction in collection and reporting rate and fields, reduction in running services, reduction in system hardware usage (e.g., drop CPU frequency, etc.), drive parking, handing sensors off to unaffected gateways or routes (e.g., when gateway knows that it or other infrastructure will go down), priority-based device shutdown in limited resource pool, sending indication to home, notifying to throttle external communication attempts, etc.

The gateway may also prime itself and devices for postpower restore. Actions may include, but are not limited to: seeding startup timers to prevent all devices from requesting connection at the same time and/or rediscovery behaviors include prioritization of restart and reconnection of devices.

In some embodiments, device configuration, dynamic data volatility metrics, and service configuration may react to power anomalies by intelligently degrading capability. Content and context-aware techniques may be used to determine which progressively more aggressive mitigations options to take. Moreover, the same metrics may be used to cause the process to restart in order to prioritize the most critical devices and data.

vi. Load Balancing

Today enterprise servers use task scheduling, reprioritization, and load balancing to maintain an optimal internal state despite wildly varying environmental and traffic conditions. This can be done by evaluating the incoming requests, comparing with current utilization and saturation rates, and determining whether priorities can still be maintained (such as serving dynamic web content) while resources are heavily utilized for other tasks (such as database requests). A server may opt to reschedule or reprioritize tasks, or completely reassign request(s) to another node on the network in order to maintain its own set of priorities.

IoT gateways are challenged in implementing similar methods to maintain an optimal internal state because, among other things, they aggregate data across a broad and heterogeneous set of IoT devices (e.g., edge devices, such as an airflow sensor, video camera, or a door lock). Also, IoT gateways serve a wide variety of purposes, and often their purpose is determined by the devices to which they connect. Moreover, IoT gateways are constrained in performance by a number of internal factors such as power, thermals, and available bandwidth to end points.

In various embodiments, techniques are presented for optimizing IoT gateway performance based on utilization and saturation rates, as well as other factors, of not only the internal components of the gateway (such as the CPU) but also of external devices connected to disparate bus architectures. In many cases, these techniques may provide ability to automatically adjust the workloads of every IoT gateway in the installation to maintain optimal internal states. In some embodiments, device, behavior, and resource management service 409 may be used to implement these techniques.

IoT gateways are constrained in performance by a number of internal factors such as power, thermals, and available bandwidth to end points. By analyzing end point access patterns and establishing correlation between predictor variables (e.g., log reads and writes, alerts, errors, and similar) and responses (e.g., CPU temperature and power consumption), performance can be optimized and long-term reliability improved through task rescheduling, reprioritization, and/or load rebalancing to other gateways on the network.

In some embodiments, techniques described herein may gather several or all possible predictor variables (e.g., internal instrumentation data within the gateway, connected devices, telemetry data for end points, end point traffic classes, etc.), identify desired and avoidable conditions (e.g., running average power targets, running average temperature, etc.), identify subset of predictors that explain variations in the target conditions (e.g., via artificial neural network), construct a model that describes the relationship between predictor and response, and/or monitor predictors and alter gateway workloads steering toward desirable states and away from undesirable states.

As such, techniques described herein may enable identification of suitable times to analyze instrumentation logs to identify opportunities to optimize performance and/or reliability, analyze gateway end point access patterns to determine subset of predictor variables correlating to a targeted (e.g., desirable or avoidable) response, and/or perform task rescheduling, reprioritization, and/or load rebalancing to other gateways on the network.

vii. Smart Lock

IoT gateways are often deployed in "headless" configurations and depending on its use case often in remote deployments that are potentially in various locations inside, outside of buildings, etc. In some cases, IoT gateway manufacturers may provide a rugged enclosure chassis for installing gateways in harsher or environments needing more security and protection. Moreover, support may be built-in for intrusion detection which can be reported/alerted to the gateway's management system.

An IoT gateway's chassis, as described herein, may provide not just physical gateway security and intrusion detection/reporting, but it may also prevent an unauthorized person from tampering, updating and using, or potentially hijacking the gateway for other purposes. For example, if an unauthorized user has physical access to the machine, then there is no security. Once the rugged enclosure is breached, anyone with physical access to the device can press the power button, plug devices into USB, serial, and HDMI/video ports, and thereby use, change, configure, or highjack the box. In some embodiments, device, behavior, and resource management service 409 may be used to implement these techniques.

In some embodiments, systems and methods described herein may provide an additional smart locking capabilities to the gateway; a cyber factor in addition to conventional intrusion detection. The gateway knows when it is locked physically using the rugged enclosure intrusion detection switch connected to the gateway. Using an OS level application, handler, or service (or in another embodiment a security microservice), the gateway may invoke a cyber lock when the intrusion system is closed/locked.

A cyber lock may additionally or alternatively disable external power button functionality, disable HDMI/video out ports, disable ability to add new USB, serial, I/O connections, and/or lock down gateway policy/configuration setup including networking setup.

Device, behavior, and resource management service 409 may be used to monitor hardware intrusion detection (e.g., other embodiments include BIOS/UEFI modules, OS app/service, etc.). Upon enabling intrusion detection, the microservice may lock down a configured list—power button control, disabling HDMI/video out, disabling ability to add new USB, serial, or I/O connections, protects any further device configuration or device setup. Then, upon the intrusion detection switch being triggered, the microservice may report out an invalid intrusion alert to system management.

The device, behavior, and resource management service 409 may also provide secure remote unlocking by a technician to disable the intrusion detection for maintenance. This can additionally be provided by local sensing, such as using Bluetooth presence detection of a known key.

Accordingly, systems and methods described herein may provide the capability to further cyber lock down a device in addition to existing physical intrusion detection, thus helping prevent further access or damage to the gateway. These systems and methods may also facilitate the disablement of hardware power button and unused USB, serial, other I/O, and HDMI/video out ports upon intrusion detection.

E. Device Identity Augmentation

In various embodiments, systems and methods described herein may augment or enhance the identity of a device by measuring various hardware and software based interactions with it and tracking them over time to establish a pattern of device characteristics and behavior. Once a behavioral pattern is established, deviations from that pattern may be detected and preventive and corrective actions taken.

Figure 5:
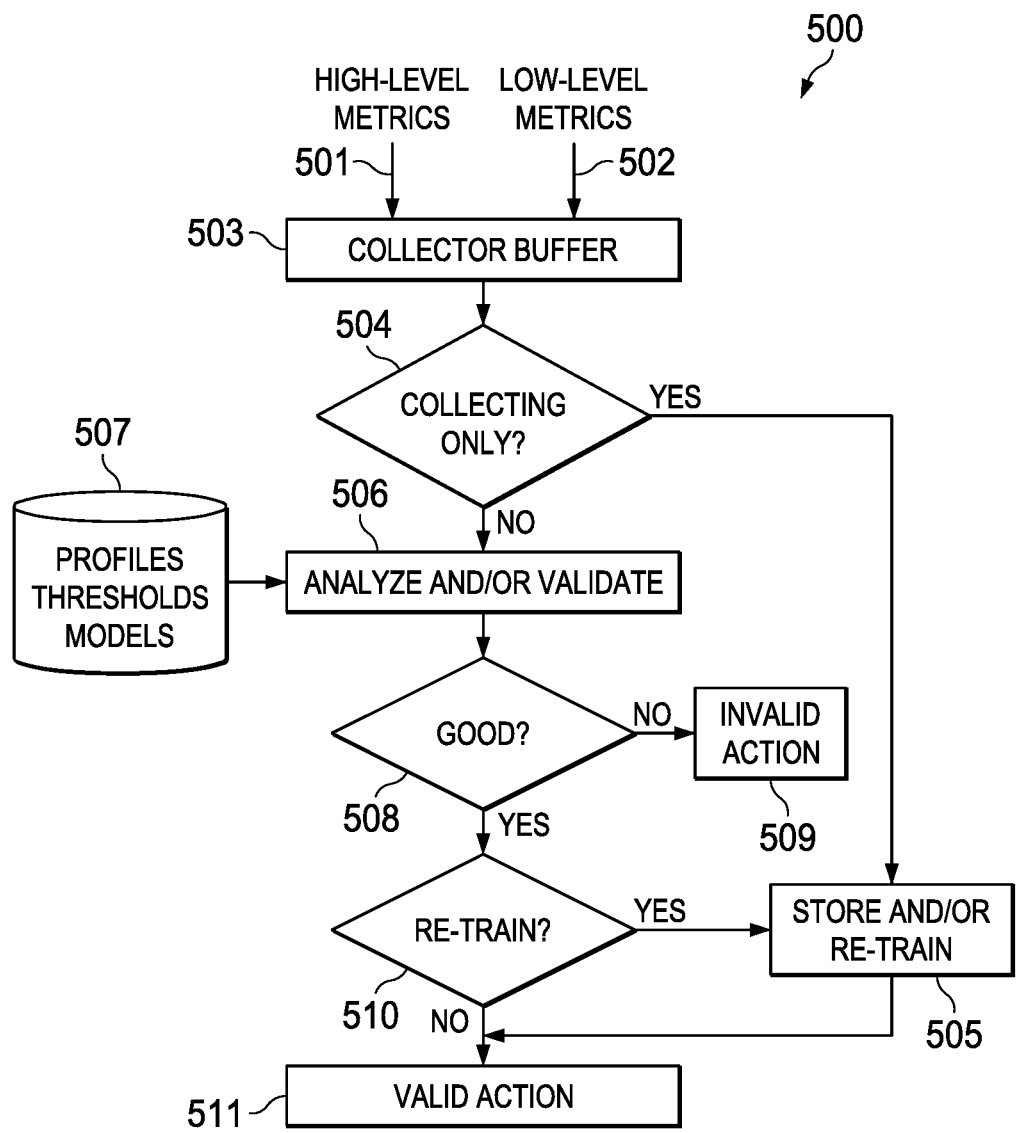
FIG. 5 illustrates an example of a device identity augmentation method according to some embodiments.

FIG. 5 illustrates an example of a device identity augmentation method 500 according to some embodiments. In various embodiments, method 500 may be implemented by device, behavior, and resource management service 409 of services 400 provided by IoT gateway 103.

In method 500, high-level device metrics 501 and low-level device metrics 502 reach collector buffer 503, and control passes to block 504. At block 504, if method 500 is in collection-only mode, control passes to store and/or re-train block 505, where metrics are stored in a table, database, or other electronic record.

At block 504, if method 500 is not in collection-only mode, block 506 performs an analysis and/or validation procedure based upon device profiles, thresholds, and model database 507. If block 508 determines that the device identity is not validated, block 509 takes "invalid action" (i.e., an action in response to a determination that the validation has failed and that the device has not been identified).

Conversely, if block 508 determines that the device identity is validated, block 510 determines whether to re-train the analysis, for example, by updating profiles, thresholds, and/or models in database 507. If so, block 505 performs one or more re-training procedures. Then, whether or not block 505 is reached, block 511 takes "valid action" (i.e., an action in response to a determination that the validation has succeed and the device has been positively identified).

In sum, method 500 includes collecting hardware (e.g., low-level) and/or software (e.g., high-level) metrics associated with a device. Method 500 also includes characterizing, augmenting, and establishing device identity using the various collected metrics. Method 500 may then perform analysis of collected metrics against established device identity metrics, detect anomalous metrics and/or take responsive actions.

To better illustrate the foregoing, consider an example implementation that includes a number of IoT sensors or devices, each configured to communicate using an RS485 serial interface. Particularly, RS485 is a serial interface specification that allows multiple devices to exist simultaneously on the same physical link while supporting a variety of higher order messaging protocols to communicate (e.g., Modbus, BACnet, Profibus, etc.).

Devices on an RS485 link do not have to be similar other than their support for RS485. For example, a connection of a motor controller, power meter, and thermostat simultaneously to the same physical medium is possible.

Communication with connected devices occurs through arbitration of the bus that allows exclusive access for a given period, providing consistency and preventing collisions in communication. During these arbitrated periods device activity is isolated and it becomes possible to collect metrics on the information transmitted by a device in order to characterize its communications and realize additional identity information about the device that is communicating.

Using the OSI stack as a model, these metrics may be collected at different layers and points in the protocol stack and the body of collected information used to both establish a pattern of normal behavior typical of a given device or group of devices as well as to determine whether a set of metrics collected from a device has deviated from any established behavioral norm.

Prior to the metric collection and analysis of method 500, it is necessary to identify metrics to be collected, and to establish thresholds and norms against which the collected metrics may be measured.

Figure 6:
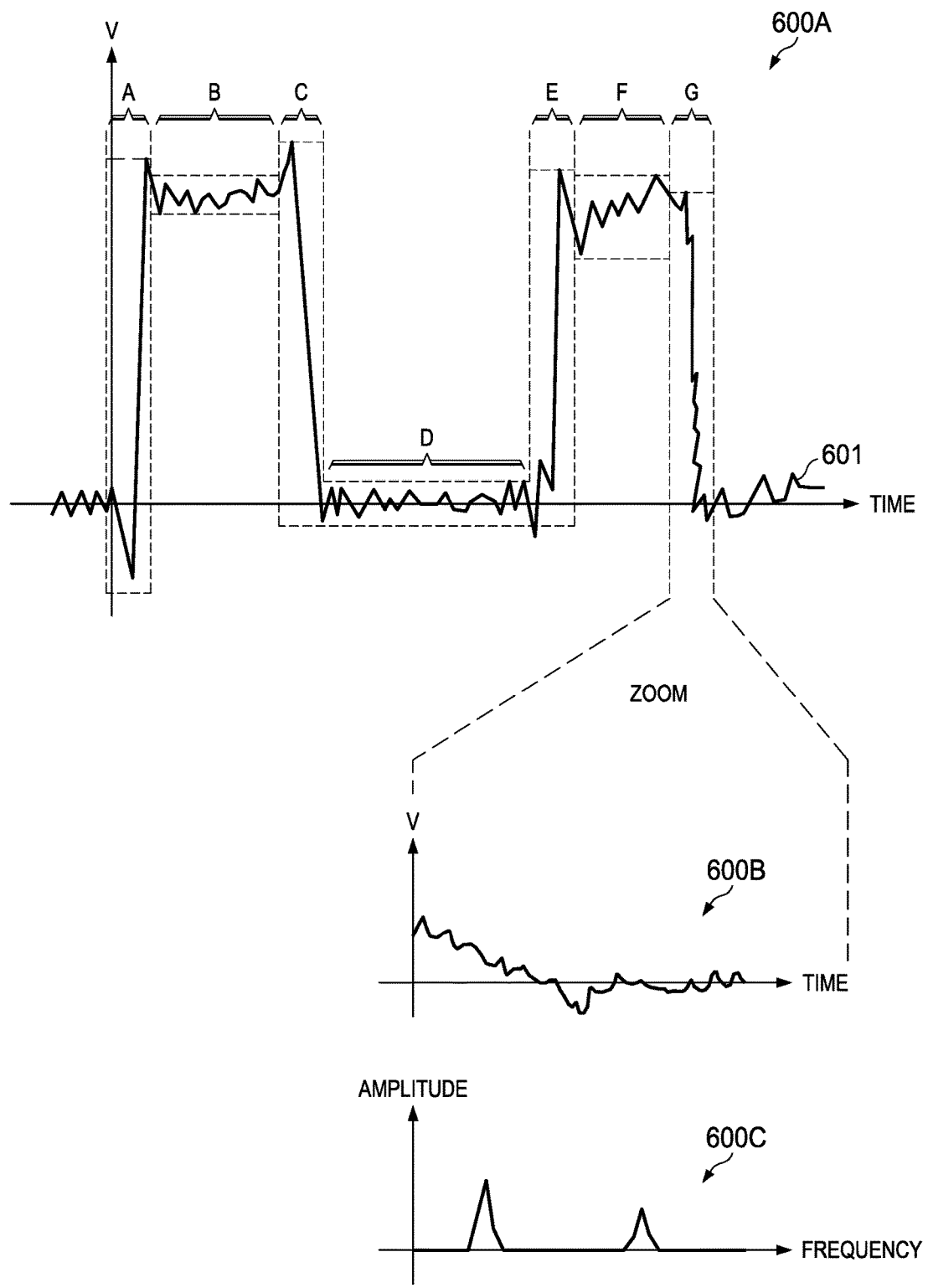
FIG. 6 illustrates a signal showing an example of low-level device metrics and thresholds usable according to some embodiments.

Low-level device metrics 502 include physical line level characteristics captured and stored for a given device. The collected metrics include voltage, current, and line impedance measurements. All of these measurements are with respect to time, and carry with them a corresponding timestamp. Maximums, minimums, and averages for each of the measured characteristics may be tracked and stored. FIG. 6 illustrates a signal showing an example of low-level device metrics and thresholds usable according to some embodiments. In this case, the foregoing metrics are generally represented by segments A-G measured with respect to the voltage axis (V) in graph 600A (voltage metrics).

Additional low-level metrics 501 or characteristics may include, for example, signal transition and sustained duration—e.g., time to rise, time to fall, time between a rise and a fall, and/or time between a fall and a rise. In FIG. 6, these metrics are also represented by segments A-G, but this time measured with respect to the time axis (time metrics).

Characterization and classification of a particular device with respect to physical communication metrics may also involve the comparison of waveforms to establish identity. In order to effectively isolate distinguishing behavioral characteristics it may be necessary to decompose analog waveform 600B measurements into a discrete Fourier transform using a Fast Fourier Transform algorithm to result in spectral graph 600C.

In FIG. 6, a signal segment (G) is broken down using an FFT into its component frequency and amplitude peaks, ((m1, A(m1)), (m2, A(m2)), . . . (mn, A(mn)). Once significant frequency components and their relative amplitudes have been established, these metrics may be tracked and compared to the historical or baseline metrics. Additionally or alternatively, they can be compared against subsequent responses or indications.

Relationships among low-level signal metrics 502 may also be tracked and stored. This may include time intervals across combinations of transitions—e.g., time to rise, sustained time, and time to fall—as well as larger composites of these combinations—e.g., $1^{st}$ combination to $2^{nd}$ combination, to $3^{rd}$ combination, to $n^{th}$ combination. Additionally or alternatively, counts of the total number of transitions; rises, falls, composites, may collected and maintained as part of tracking communication characteristics. For example, a collected metric from FIG. 6 may include segments A+B+C in the time domain for a given response.

High-level device metrics 501 may include, for example, synchronous or command/response-style communications, as well as asynchronous or device-initiated indications are labeled and stored along with a timestamp. Labels may be customized by a user, and therefore may describe the type of operation being performed and/or additional identifying characteristics of the specific protocol and device—e.g., "motor voltage get." These high-level metrics 502 may be time correlated with lower-level metrics 501 in order to associate lower-level communication characteristics with a higher-level communication protocol and corresponding labels.

Additional high-level metrics 501 may be tracked given the response or indication received from a device. These include metrics such as message or number of packets, packet size, packet content, request type, start time of a request or communication, or end time of a request or communication.

For example, a high-level command may be issued to get a motor voltage, triggering collection of information related to the request and response. Both high-level and low-level metrics 501 and 502 are collected into a buffer for analysis and incorporation into the historic set of data collected for the given device.

As part of identifying a device, it is sometimes desirable to compare the metrics of one device with device metrics that belong to associated devices. For instance, in a hypothetical situation, if a motor is running, then a power meter associated with that motor should show a voltage, and a microphone nearby should detect sound. To achieve this, associations between device metrics and devices may be known or learned in order to identify the set of metrics that should be used against baselines and thresholds used to confirm a device's identity.

In some embodiments, associations between device metrics may be made manually by a user or administrator, or may be learned over a period of time through analysis of the data itself. For the purposes of the foregoing hypothetical, assume that a user makes an explicit association between a set of device metrics. An example of this would be associating a get operation on a motor voltage, with get operations on a meter voltage and microphone state (active/inactive). In some cases, an "Associated Metrics Profile" (or simply "profiles") stored in database 507 includes a descriptor for describing these associations. In various embodiments, such a profile may provide a template for the metrics to be collected from an associated device, but it does not describe which associated devices to use for collection.

As such, in this hypothetical it becomes necessary to outline the association between devices that will be used in the collection of the metrics. This may be manually provisioned by a user or administrator, or via automated learning over a period of time through analysis of the metrics set identified above.

For purposes of this example, assume that the user makes an explicit association between a set of devices. An example of this would be associating a specific motor with a meter and a microphone. Particularly, when the get operation for the motor voltage metric occurs, the process may also perform a get operation on the meter's voltage and microphone's state. The collected metrics from each device are stored in buffers that are then used for collection, analysis and validation.

It should be noted that often there are a large number of high-level metrics that can be collected from the connected devices. In some embodiments, the associated metrics descriptor may be changed from time to time, therefore also changing the collected metrics, associated thresholds, baselines, and/or models that are used in analysis. By changing these descriptors over time, sometimes in an unpredictable or random manner, for example, certain systems and methods described herein may also make it difficult for an observer or attacker to consistently spoof a device.

In order to validate the collected measurements against normal behaviors, a series of thresholds or baselines may be established. Particularly, lower-level signal thresholds and higher-level protocol thresholds may be defined.

Low-level signal thresholds may be established via database 507 to validate that responses that are received at a signal level meet expected tolerances associated with a given device. These low-level thresholds may include a static set of thresholds, observed thresholds, and/or learned thresholds, and may be derived in a number of ways.

A static set of thresholds may be manually established by a user that indicates that a voltage level and duration be meet at given threshold for a device response to be valid and characteristic of the responding device (e.g. 4.95 to 5.05 V sustained between 90 to 110 µs). Additionally or alternatively, modifiers may be applied to the thresholds, such as, for example: +/−5% of minimum response time<response time<+/−5% maximum response time, and +/−2% of minimum voltage<voltage<+/−3% of maximum voltage.

Additionally or alternatively, observed thresholds may be established based upon empirical observation of the device in question over time. For example, assume that the response level and duration of a signal falls between 4.7 and 5.4 V over a 90 to 105 μs interval in 95% of cases, then these values may become the thresholds for this characteristic response.

Further, a machine learning algorithm may be employed to observe the cumulative set of metrics over time, and to establish a pattern of characteristic responses that may then be used for classification (learned threshold). A user or administrator may define a probability threshold as a metric of validity—e.g., the observed measurements when compared to a model must meet a 98% confidence or better to be considered valid.

High-level thresholds may be similar to low-level thresholds insofar as guidance around the high level protocol may be based upon manual or automated operations using static or learned thresholds or a combination of any. For example a user or administrator may manually establish an expected response window for a command response style exchange between a host and a device—e.g., after sending a command, 0.8 ms<response time<2.6 ms. Similarly, additional modifiers may be defined—e.g., +/−5% of minimum response time<response time<+/−5% of maximum response time.

Still with respect to high-level thresholds, levels may be established based upon observation of the device in question over time, and/or machine learning algorithms may be employed to determine a pattern in the metrics data that are characteristic of the device and then those for classification. Then the user or administrator may define a probability threshold as a metric of validity—e.g., the observed measurements when compared to a model must meet a 93% confidence or better to be considered valid.

For the high-level protocol analysis, inspection of the received data may also be performed as part of validation. As such, establishing valid values, ranges, formatting, or other data associations may be manually performed by a user or administrator—e.g., following a request for a voltage reading from a device a valid voltage reading range in the response may require that the received value to fall between 0 and 240 volts.

Similarly, a machine learning algorithm may be applied to all responses over time and through usage of that algorithm an appropriate value range for the voltage reading may be learned for the device in question (as opposed those that may be set by a user). A user would then establish a probability threshold that would need to be met in order to consider the response as valid.

Thresholds may also be established manually or learned for additional metrics such as packet size, fixed values within the packet, relative values within the packet—e.g., field X has a value of 1, then field Y may fall between 10 to 100—and other intra-packet data relationships.

The foregoing high-level protocol analysis typically refers to a single received packet. However, for synchronous, command response-style communications, thresholds may also include data associations that exist between the command and response, and may be identified and set either manually or through similar machine learning analysis.

As part of the analysis, a "rules engine" may be employed to validate metrics using thresholds and patterns established earlier. This rules engine may process the collected metrics buffers using programmable logic. Examples of a rules engine include the open source Drools Business Rules Management System or MICROSOFT WINDOWS WORKFLOW FOUNDATION.

A rules engines may be capable of loading a dynamically defined set of rules and executing them upon a given set of inputs—e.g., Rule A: if (motor.voltage>0) and (meter.voltage<110) and (microphone.state=1), then return 0, else return 1. As a person of ordinary skill in the art will recognize in light of this disclosure, such rules engines may enable variability of the rules, operators, and operands, and cover a wide range of logic, arithmetic, pattern analysis, temporal, and other operations.

Generated outputs from an executed rule may be used to synthesize a new input metric and re-factor it back into the collected metrics buffers to be used for further analysis. Additionally or alternatively, an output may contribute to the overall conclusion regarding the validity of the collected data.

Still as part of the analysis, an analytics engine may be employed to validate metrics using one or more machine learning algorithms. The analytics engine may employ machine learning algorithms for prediction and classification. Generally, this solution may look to classify. For these algorithms, a set of data is collected and used to train a statistical model of expected outcomes based upon the input (metrics) and associations among them. Once created and validated, that model is then used to in conjunction with each new set of inputs to determine the probability that the new inputs fit the pattern of associations (behavior) that are captured within the statistical model. Examples of an analytics engines include open source Scikit-Learn, GoLearn, Weka, and Java-ML.

Similarly to the rules engine output, the analytics engine's outputs from may be used to synthesize a new input metric and refactor it back into the collected metrics buffers to be used for further analysis, and/or an output may simply contribute to the overall conclusion regarding the validity of the collected data.

After analyzing the metrics, if the solution is configured to store the data, it can do so for further analysis. This would be beneficial in retraining and refining the characteristics of a specific device, and to further develop a longer and more comprehensive set of data over which to characterize its behavior and identity.

This data may also be fed to a larger data set in order to form an aggregate set of characteristics—e.g., accumulate data over many motors of a given make and model, and then construct a model of their cumulative characteristics, thus creating more meaningful averages, maximums, minimums, packet patterns, response times, etc., and the associations among these features over time.

Once analysis of the data has occurred, the IoT gateway may be programmed to take some selected action. This may be accomplished by using a rules engine such as the one described above. For example, in the event that a set of metrics was found to match the characteristics of the established model or thresholds for a given device, a rule may be established to allow to pass the packet to the originating caller. However, if the rule found that the metrics did not meet the established criteria, then an action may be taken—e.g., Rule B: if motor_model.score(motor)<98 then send SMS As will be apparent to a person of the ordinary skill in the art with the benefit of this disclosure, rules may be entirely custom-designed: raise an alarm, send a message, store the data to a file, trigger a switch, etc. The action may be realized as REST call or message invocation on an end point either locally or on a remote system, providing the device information, captured metrics (or reference to them), and resulting condition of analysis.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
   one or more processors; and
   a memory coupled to the one or more processors, the memory including program instructions stored thereon that, upon execution by the one or more processors, cause the IHS to:
   receive high-level metrics;
   receive low-level metrics, wherein the low-level metrics are obtained from a waveform representing an electronic communication between a device and the IHS;
   decompose the waveform into frequency components;
   compare the frequency components with other frequency components of another waveform of representing another electronic communication between another device and the IHS;
   determine, based upon the comparison and using a plurality of sets of threshold values, that the high-level metrics and the low-level metrics match at least one of a plurality of device profiles; and
   at least one of: (a) identify the device as belonging to class of devices corresponding to the matching device profile, or (b) identify whether at least a subset of the high-level metrics or the low-level metrics are outside one or more of the sets of threshold values.

2. The IHS of claim 1, wherein the IHS is an Internet-of-Things (IoT) gateway in an IoT network, and wherein the device is an IoT device.

3. The IHS of claim 1, wherein the low-level metrics include at least one of: a voltage measurement, a current measurement, or a line impedance measurement.

4. The IHS of claim 1, wherein the low-level metrics include at least one of: a signal's time to rise, a signal's time to fall, a time between a signal's rise and a fall, or a time between a signal's fall and a rise.

5. The IHS of claim 1, wherein the other device belongs to a known class.

6. The IHS of claim 1, wherein the high-level device metrics include at least one of: number of packets, packet size, packet content, request type, start time of request or communication, or end time of request of communication.

7. The IHS of claim 1, wherein to determine that that the high-level metrics and the low-level metrics match the at least one of the plurality of device profiles, the program instructions, upon execution, further cause the IHS to perform a correlation operation between the high-level metrics and the low-level metrics.

8. The IHS of claim 1, wherein to determine that the high-level metrics and the low-level metrics match the at least one of the plurality of device profiles, the program instructions, upon execution, further cause the IHS to associate the at least one of the high-level metrics with the at least one of the low-level metrics.

9. The IHS of claim 8, wherein the high-level metrics correspond to the device, and wherein the low-level metrics correspond to another device.

10. The IHS of claim 9, wherein the device includes a noise source, and wherein the other device includes a microphone.

11. The IHS of claim 10, wherein the other device produces an electrical or acoustic waveform as result of a command transmitted to the device via a serial communication bus.

12. The IHS of claim 1, wherein the program instructions, upon execution by the one or more processors, further cause the IHS to:
   (a) re-evaluate the identity of the device using newly received high-level metrics or low-level metrics;
   (b) select metrics to follow a pattern configured to prevent spoofing attempts; or
   (c) re-learn the identity of the device in response to repair or replacement.

13. A hardware memory device having program instructions stored thereon that, upon execution by an Information Handling System (IHS), cause the IHS to:
   receive high-level metrics;
   receive low-level metrics, wherein the low-level metrics are obtained from a waveform representing an electronic communication between an Internet-of-Things (IoT) device and the IHS;
   decompose the waveform into frequency components;
   compare the frequency components with other frequency components of another waveform of representing another electronic communication between another IoT device and the IHS;

determine, based upon the comparison and using a plurality of sets of threshold values, that the high-level metrics and the low-level metrics match at least one of a plurality of IoT device profiles; and at least one of: (a) identify the IoT device as belonging to a class of IoT devices corresponding to the matching IoT device profile, or (b) identify whether at least a subset of the high-level metrics or the low-level metrics are outside one or more of the sets of threshold values.

14. The hardware memory device of claim 13, wherein the program instructions, upon execution by IHS, further cause the IHS to perform at least one of:

compare a present interaction with the IoT device against a previous interaction with the same IoT device;

classify the IoT device as belonging to a group of other IoT devices of same make or model; or associate the IoT device with a group of other IoT devices of different types, make, or model.

15. The hardware memory device of claim 13, wherein the low-level metrics include at least one of: a voltage measurement, a current measurement, or a line impedance measurement, and wherein the high-level device metrics include at least one of: number of packets, packet size, packet content, request type, start time of request or communication, or end time of request of communication.

16. The hardware memory device of claim 13, wherein to determine that the high-level metrics and the low-level metrics match the at least one of the plurality of IoT device profiles, the program instructions, upon execution, further cause the IHS to associate at least one of the high-level metrics with at least one of the low-level metrics, wherein the at least one of the high-level metrics corresponds to the IoT device, and wherein the at least one of the low-level metrics corresponds to a second IoT device.

17. A method, comprising:
receiving high-level metrics;
receiving low-level metrics;
determining, using a plurality of sets of threshold values, that the high-level metrics and the low-level metrics match at least one of a plurality of Internet-of-Things (IoT) device profiles;

at least one of: (a) identifying an IoT device as belonging to class of IoT devices corresponding to the matching IoT device profile, or (b) identifying whether at least a subset of the high-level metrics or the low-level metrics are outside one or more of the sets of threshold values; and at least one of: (a) re-evaluating the identity of the IoT device using newly received high-level metrics or low-level metrics; (b) selecting the high-level metrics or low-level metrics being used over time to follow a pattern configured to prevent spoofing attempts; or (c) resetting or re-learning the identity of the IoT device in response to repair or replacement.

18. The method of claim 17, wherein the low-level metrics include at least one of: a voltage measurement, a current measurement, or a line impedance measurement, and wherein the high-level device metrics include at least one of: number of packets, packet size, packet content, request type, start time of request or communication, or end time of request of communication.

19. The method of claim 17, wherein determining that the high-level metrics and the low-level metrics match the at least one of the plurality of IoT device profiles further comprises associating at least one of the high-level metrics with at least one of the low-level metrics, wherein the at least one of the high-level metrics correspond to the IoT device, and wherein the at least one of the low-level metrics correspond to a second IoT device.

20. The method of claim 17, wherein the low-level metrics are obtained from a waveform representing a communication between the device and the IHS, the method further comprising:

decomposing the waveform into frequency components;

comparing the frequency components with other frequency components of another waveform of representing another communication between another IoT device and the IHS; and determining that the high-level metrics and the low-level metrics match at least one of the plurality of IoT device profiles based upon the comparison.

* * * * *